United States Patent [19]
Klein

[11] Patent Number: 6,011,473
[45] Date of Patent: *Jan. 4, 2000

[54] METHOD FOR GENERATING AN ALARM IN A PORTABLE COMPUTER SYSTEM

[75] Inventor: Dean A. Klein, Eagle, Id.

[73] Assignee: Micron Electronics, Inc., Nampa, Id.

[ * ] Notice: This patent is subject to a terminal disclaimer.

[21] Appl. No.: 09/006,316

[22] Filed: Jan. 13, 1998

[51] Int. Cl.$^7$ .................................................. G08B 13/14
[52] U.S. Cl. ............................................ 340/571; 341/176
[58] Field of Search ................................. 340/571, 568.1, 340/539; 341/176; 359/142; 379/37; 395/186, 188.1

[56] References Cited

U.S. PATENT DOCUMENTS

| | | | |
|---|---|---|---|
| 4,686,514 | 8/1987 | Liptak et al. ............................ | 340/571 |
| 4,804,943 | 2/1989 | Soleimani ............................ | 340/571 X |
| 5,406,261 | 4/1995 | Glenn ...................................... | 340/571 |
| 5,448,748 | 9/1995 | Yawata et al. ........................... | 364/500 |
| 5,675,321 | 10/1997 | McBride ................................. | 340/568 |
| 5,748,084 | 5/1998 | Isikoff .................................. | 340/571 X |
| 5,767,771 | 6/1998 | Lamont ................................... | 340/571 |

*Primary Examiner*—Thomas Mullen
*Attorney, Agent, or Firm*—Park & Vaughan

[57] ABSTRACT

One embodiment of the present invention provides a system for generating an alarm in a portable computer system. In this embodiment, when an owner of a portable computer system determines that the portable computer system is either stolen or missing, the owner activates a remote transmitter. This remote transmitter sends an activation signal to a receiver in the portable computer system. In response to the activation signal, the portable computer system takes at least one theft deterrence action, such as generating an audio alarm. In one embodiment of the present invention, the theft deterrence action includes erasing at least part of the contents of a data storage device in the portable computer system. In another embodiment, the theft deterrence action includes disabling power for the portable computer system. In yet another embodiment, the theft deterrence action includes dialing a telephone number through a mobile telephone coupled with the portable computer system.

18 Claims, 3 Drawing Sheets

METHOD FOR GENERATING AN ALARM IN A PORTABLE COMPUTER SYSTEM

RELATED APPLICATION

The subject matter of this application is related to the subject matter in a co-pending non-provisional application by the same inventor as the instant application and filed on the same day as the instant application entitled, "Apparatus For Generating an Alarm in a Portable Computer System," having Ser. No. 09/006,403, and a filing date of Jan. 13, 1998.

BACKGROUND

1. Field of the Invention

The present invention relates to portable computer systems, and more particularly to a method for generating an alarm in a portable computer system in response to an alarm activation signal from a remote transmitter.

2. Related Art

Theft deterrence is of particular concern to owners of portable computer systems. Portable computer systems, such as notebook and laptop computers, can be worth many thousands of dollars, and are small and easy to carry away. This has made portable computer systems a favorite target of thieves. Portable computer systems are often stolen in train stations, airports, libraries and hotels. If the owner of a portable computer system is inattentive, even for an instant, a thief can pilfer the portable computer system, and make a quick get away into a crowd of travelers. Because portable computer systems can be easily concealed, even if the owner of a portable computer system becomes aware of the theft immediately after it occurs, it is unlikely that the owner will be able to locate the portable computer system in crowd of travelers.

Furthermore, the theft of a portable computer system can be quite costly. In addition to the value of the portable computer system itself, the owner of a portable computer system can lose valuable data and sensitive information stored on the portable computer system.

What is needed is an alarm for a portable computer system that will aid in determining the location of a stolen or missing portable computer system, and will hopefully deter theft of the portable computer system.

Additionally, what is needed is a mechanism that protects or destroys sensitive data in a portable computer system if the portable computer system becomes stolen or is missing.

SUMMARY

One embodiment of the present invention provides a system for generating an alarm in a portable computer system. In this embodiment, an owner of the portable computer system activates a remote transmitter when the owner determines that the portable computer system is either stolen or missing. This remote transmitter sends an activation signal to a receiver in the portable computer system. In response to the activation signal, the portable computer system sets an alarm condition, and takes at least one theft deterrence action, such as generating an audio alarm.

The activation signal can assume a number of different forms in various embodiments of the present invention. In one embodiment, the activation signal includes an infrared signal. In another embodiment, the activation signal includes a radio frequency signal. In a variation on this embodiment, the activation signal includes a low-power pager signal. In another embodiment, the activation signal includes an interruption in a proximity signal, wherein the proximity signal is of limited range and is regularly broadcast from the remote transmitter. In this embodiment, an interruption in the proximity signal received by the portable computer system indicates that the portable computer system has left the proximity of the remote transmitter.

A number of different theft deterrence actions are used in different embodiments of the present invention. In some embodiments, the theft deterrence action includes erasing at least part of the contents of a data storage device in the portable computer system. In some embodiments, the theft deterrence action includes disabling power for the portable computer system.

In another embodiment of the present invention, the theft deterrence action includes determining a location for the portable computer system by using a position locating system, such as the global positioning system (GPS). This location information is transmitted to a remote receiver to inform the remote receiver of the location of the portable computer system.

In yet another embodiment of the present invention, the theft deterrence action includes preventing a login to the portable computer system.

In yet another embodiment of the present invention, the theft deterrence action includes sending a mobile telephone signal from the portable computer system to call a telephone number. In a variation on this embodiment, a caller identification feature in the telephone system identifies the source of the mobile telephone signal.

In another embodiment of the present invention, the portable computer system can receive a deactivation signal, and can reset the alarm condition in response to the deactivation signal. In another embodiment, the portable computer system resets the alarm condition if a user of the portable computer system inputs a valid deactivation signal into the portable computer system.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of the Basic Operation of One Embodiment of the Invention

Figure 1:
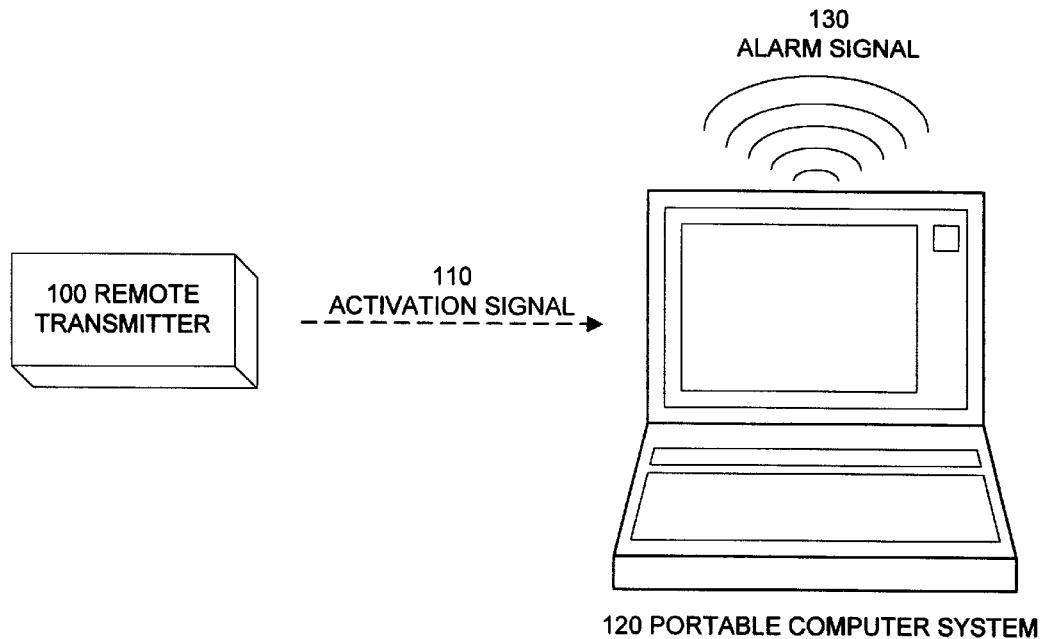
FIG. 1 illustrates how remote transmitter 100 activates alarm signal 130 from portable computer system 120 in accordance with an embodiment of the present invention.

FIG. 1 illustrates how remote transmitter 100 activates alarm signal 130 from portable computer system 120 in accordance with an embodiment of the present invention. In this embodiment, remote transmitter 100 transmits activation signal 110, which is received at portable computer system 120. This activation signal 110 causes portable computer system 120 to generate an alarm signal 130.

Remote transmitter 100 may be any type of transmitter capable of sending a signal to portable computer system 120. This includes, but is not limited to, radio frequency and infrared transmitters of limited range, such as transmitters that are used to activate keyless entry systems for automobiles or garage door openers. This may also include radio frequency transmitters of wider range, such as transmitters that are used to send pager signals. Other embodiments may use audio signals, such as ultrasonic audio signals.

Activation signal 110 may be any type of signal that can be used to activate an alarm. In one embodiment, activation signal 110 includes a sine wave at a particular frequency. In another embodiment, activation signal 110 includes a specific pattern modulated on a carrier signal. In yet another embodiment, activation signal 110 takes the form of an interruption in a proximity signal. This proximity signal is of limited range and is regularly broadcast from remote transmitter 100. An interruption in the proximity signal indicates that portable computer system 120 has left the proximity of remote transmitter 100.

Portable computer system 120 may be any type of computer system that can be easily transported. This includes, but is not limited to, laptop computers, notebook computers, palmtop computers, personal organizers and personal digital assistants. Portable computer systems typically include a portable source of power, such as a battery, for providing electrical power to the portable computer system.

Alarm signal 130 may be any type of signal sent from portable computer system 120 for purposes of deterring theft or locating portable computer system 120. In one embodiment, alarm signal 130 is an audio alarm. In another embodiment, alarm signal 130 is a mobile telephone signal that is used to call a telephone number.

Other embodiments of the present invention do not send an alarm signal, such as alarm signal 130, but instead take some other theft deterrence action. These theft deterrence actions may include, but are not limited to, erasing at least part of the contents of a data storage device in the portable computer system, and disabling power for the portable computer system.

The embodiment illustrated in FIG. 1 can deter theft in the following way. If the owner of portable computer system 120 determines that portable computer system 120 is stolen or missing, the owner can activate remote transmitter 100, which generates activation signal 110. Activation signal 110 is received at portable computer system 120 and activates an audio alarm signal 130. Alarm signal 130 hopefully allows the owner to locate portable computer system 120. Alarm signal 130 may also cause a thief to get rid of portable computer system 120 in order to evade notice or capture. Other embodiments of the present invention may take other theft deterrence actions in response to activation signal 110 as are discussed below.

Description of the Structure of One Embodiment of the Invention

Figure 2:
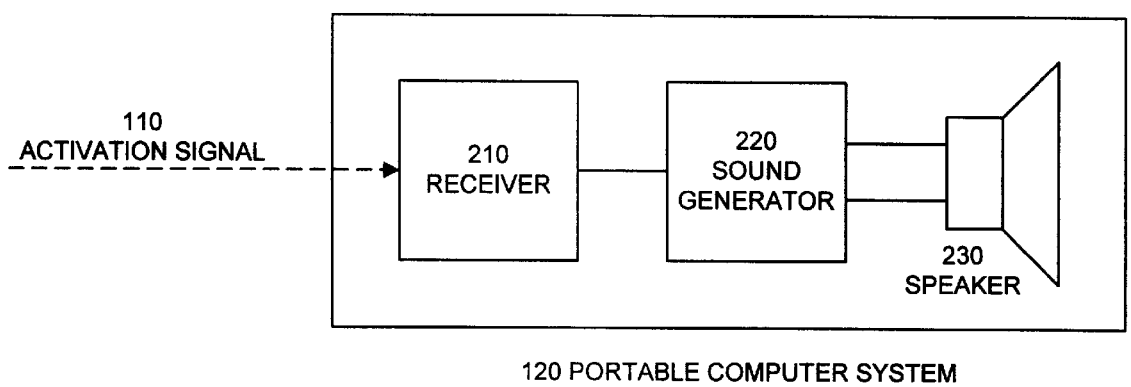
FIG. 2 is a high-level diagram of part of the internal structure of portable computer system 120 from FIG. 1 in accordance with an embodiment of the present invention.

FIG. 2 is a high-level diagram of part of the internal structure of portable computer system 120 from FIG. 1 in accordance with an embodiment of the present invention. In this embodiment, activation signal 110 is received by receiver 210 in portable computer system 120. In response to activation signal 110, receiver 210 activates sound generator 220, which creates an audio alarm signal 130 through speaker 230.

Receiver 210 may be any suitable receiver that receives and optionally decodes activation signal 110. In one embodiment, receiver 210 is configured to receive a limited range radio frequency or infrared signal, such as keyless entry signal for an automobile or a garage door opener signal. In another embodiment, receiver 210 is a conventional pager receiver that is installed in portable computer system 120.

Sound generator 220 may be any suitable sound generating device. In one embodiment, sound generator 220 includes an audio subsystem 315 in portable computer system 120. In another embodiment, sound generator 220 includes a simple circuit that provides a suitable electrical signal to a buzzer. In yet another embodiment, sound generator 220 includes a simple oscillator that generates a waveform of suitable amplitude and frequency. In another embodiment, sound generator 220 includes a microprocessor within portable computer system 120, which executes code to generate an audio alarm signal 130.

Speaker 230 may be any suitable sound-producing device. In one embodiment, speaker 230 includes one or more speakers that are conventionally utilized on a laptop computer. In another embodiment, speaker 230 includes a buzzer or a special-purpose high dB speaker.

Description of the Structure of Another Embodiment of the Invention

Figure 3:
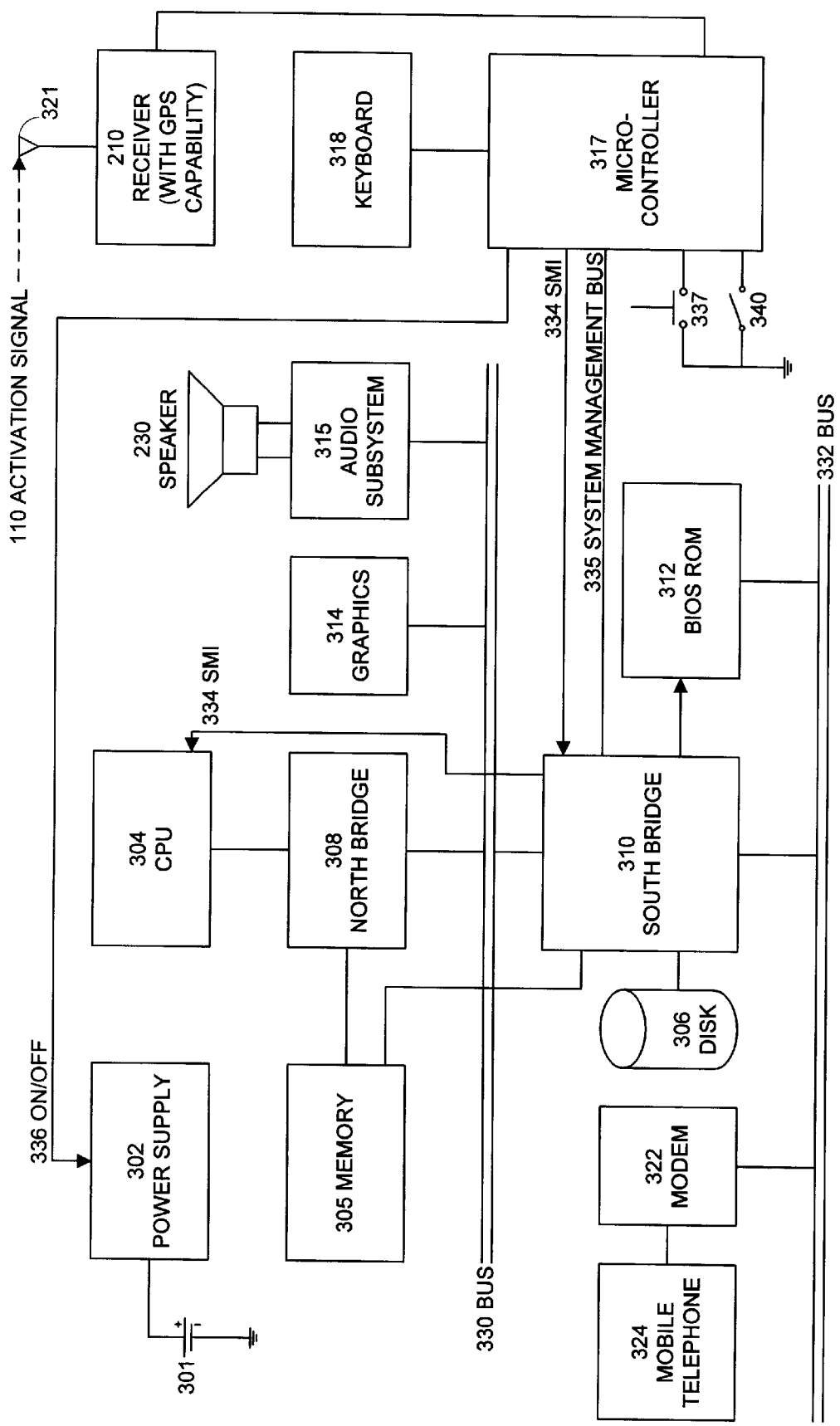
FIG. 3 is a detailed diagram of part of the internal structure of portable computer system 120 from FIG. 1 in accordance with another embodiment of the present invention.

FIG. 3 is a detailed block diagram of part of the internal structure of portable computer system 120 from FIG. 1 in accordance with another embodiment of the present invention. In addition to components commonly found in a portable computer system, the embodiment illustrated in FIG. 3 includes a receiver 210 coupled to an antenna 321 for receiving activation signal 110.

In this embodiment, receiver 210 is coupled to microcontroller 317, which is also used for power management functions within portable computer system 120. Microcontroller 317 receives inputs from push button 337 and lid switch 340. Push button 337 is an on/off power button, for turning on portable computer system 120. Lid switch 340 is a switch that is activated when a portable computer system 120 is opened by unfolding a lid portion of portable computer system 120 from a keyboard portion of portable computer system 120. Microcontroller 317 additionally receives an input from keyboard 318, which allows microcontroller 317 to detect when a key within keyboard 318 has been depressed. Microcontroller 317 additionally outputs an on/off signal 336, which feeds into power supply 302. Power supply 302 is itself coupled to battery 301.

Thus, in the illustrated embodiment, microcontroller 317 is able to determine a number of conditions: if push button 337 has been depressed; if the lid of portable computer system 120 has been opened; or if a key on the keyboard has been depressed. In response to any of these conditions, microcontroller 317 can turn portable computer system 120 on by activating power supply 302, which will channel power from battery 301 to various electrically powered components within portable computer system 120. Microcontroller 317 additionally outputs system management interrupt (SMI) signal 334, which feeds through south bridge 310 into central processing unit (CPU) 304. SMI signal 334 can cause CPU 304 to take an interrupt. During this interrupt, CPU 304 can perform a number of actions, including a theft deterrence action if the interrupt was the result of an alarm condition. Microcontroller 317 is additionally coupled to south bridge 310 through system management bus 335.

In the illustrated embodiment, CPU 304 is coupled through north bridge 308 to memory 305 and to bus 330. Memory 305 can be any type of semiconductor memory that can be used in a computer system. Bus 330 can be any type of computer system bus. In one embodiment, bus 330 includes a PCI bus. Bus 330 is coupled to graphics module 314, which processes graphical images for portable computer system 120. Bus 330 is additionally coupled to audio subsystem 315, which generates audio signals. Audio subsystem 315 is coupled to speaker 230, so that the audio signals generated by audio subsystem 315 are outputted through speaker 230.

In the illustrated embodiment, CPU 304 is additionally coupled with south bridge 310 through north bridge 308. South bridge 310 is coupled with disk 306, which may include any type of non-volatile storage device. This includes, but is not limited to, magnetic, optical, magneto-optical storage and flash memory storage devices. South bridge 310 is additionally coupled with memory 305 through a dedicated pathway. This pathway allows direct memory accesses (DMA) between disk 306 and memory 305. South bridge 310 is also coupled with bus 332, which can be any type of computer system bus. In one embodiment, bus 332 includes an ISA bus. Bus 332 allows CPU 304 to communicate with BIOS ROM 312 and modem 322, which are coupled to bus 332. Modem 322 may be any type of modem through which portable computer system 120 can communicate across a telephone line. In the illustrated embodiment, modem 322 is coupled with mobile telephone 324. Mobile telephone 324 may include mobile telephone circuitry that is integrated into portable computer system 120, or it may include a stand-alone mobile telephone coupled to modem 322 through a telephone jack.

During operation of the illustrated embodiment, receiver 210 receives an activation signal from remote transmitter 100 through antenna 321. This activation signal feeds into microcontroller 317, and causes microcontroller 317 to generate an interrupt signal on SMI 334. This interrupt signal propagates to CPU 304 and causes CPU 304 to jump to a location pointed to by an interrupt vector.

CPU 304 then determines if the interrupt was caused by an alarm activation signal from receiver 210. If not, CPU 304 continues with normal SMI processing. If so, CPU 304 activates at least one of a number of possible theft deterrence actions. One possible theft deterrence action is to cause audio subsystem 315 to send an audio alarm signal 130 through speaker 230. Another theft deterrence action is to disable portable computer system 120. Portable computer system 120 can be disabled in a number of ways. CPU 304 can command microcontroller 317 to shut down power to portable computer system 120 through on/off signal 336. Alternatively, CPU 304 can disable all logins to portable computer system 120. Another possible theft deterrence action includes sending a signal through modem 322 to cause mobile telephone 324 to call a home telephone number. If portable computer system 120 includes a mechanism to determine its location, such as a global positioning system (GPS) receiver, this location information can be communicated to a receiver at the home telephone number. This location information can assist the portable computer system owner in retrieving the portable computer system. Yet another possible theft deterrence action is to command CPU 304 to erase sensitive data or code stored on disk 306. In one embodiment, this erasure is accomplished through an explosive device that destroys disk 306. In another embodiment, this erasure is accomplished magnetically.

Other embodiments of the present invention provide a mechanism to disable the alarm condition. In one embodiment, portable computer system 120 receives an alarm deactivation signal through receiver 210, and this signal causes the system to reset the alarm condition, so that portable computer system 120 returns to normal operation. In another embodiment, if a portable computer system user inputs the proper code into keyboard 318, the alarm condition will be similarly reset.

Description of the Operation of One Embodiment of the Invention

Figure 4:
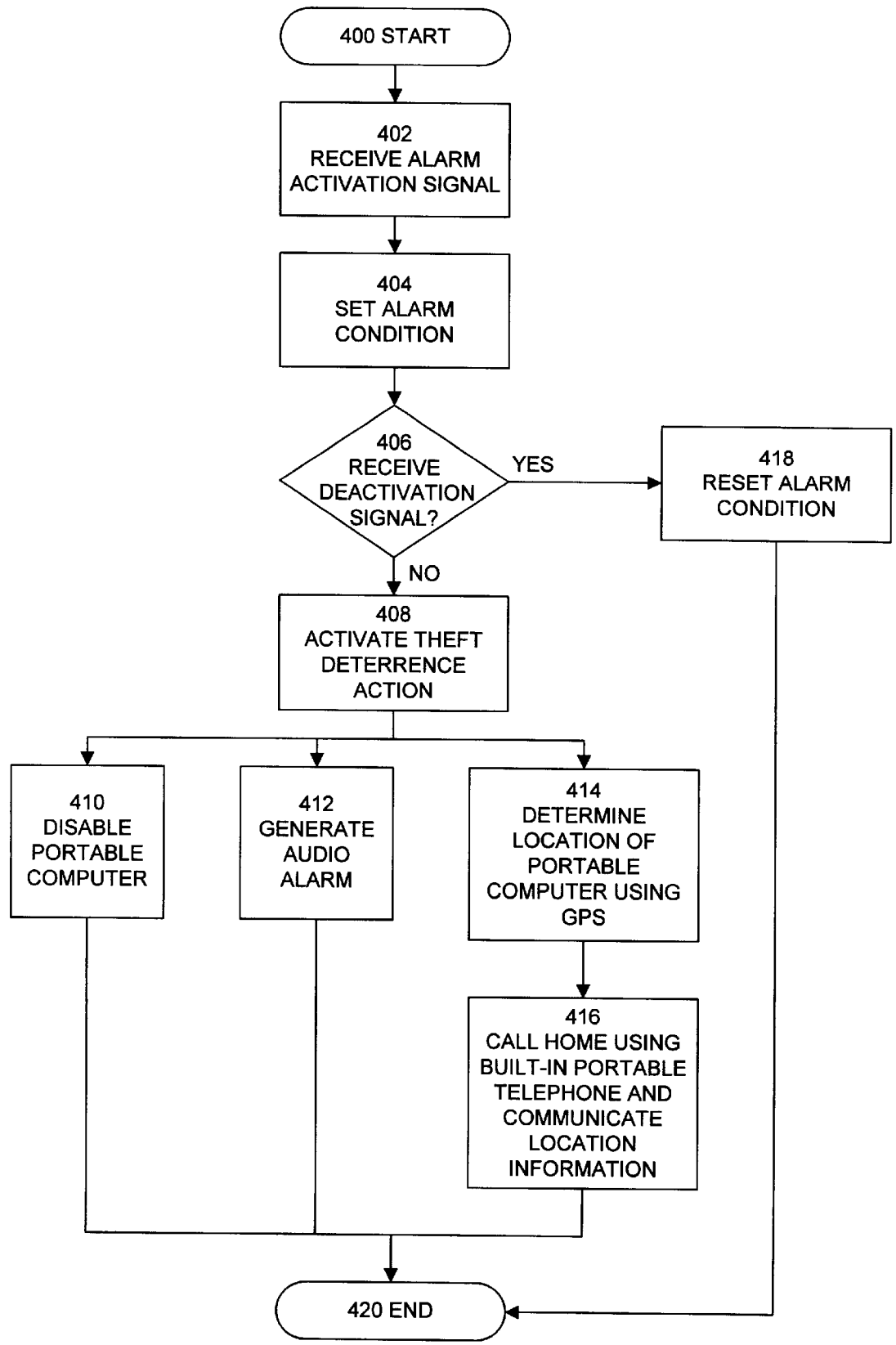
FIG. 4 is a flow chart illustrating some of the steps involved in generating an alarm in portable computer system 120 in accordance with an embodiment of the present invention.

FIG. 4 is a flow chart illustrating some of the steps involved in generating an alarm in portable computer system 120 in accordance with another embodiment of the present invention. In this embodiment, portable computer system starts in state 400. The system next proceeds to state 402. In state 402, portable computer system 120 receives an alarm activation signal 110 from remote transmitter 100. The system next advances to state 404. In state 404, the system sets an alarm condition. In one embodiment, setting the alarm condition involves changing the contents of a variable in a computer program. In another embodiment, setting the alarm condition involves changing the execution flow of a program running on CPU 304 with a conditional branch instruction. The system next advances to state 406. In state 406, the system determines whether or not a deactivation signal has been received. In one embodiment, this deactivation signal is received through receiver 210. In another embodiment, this deactivation signal is entered into portable computer system 120 through keyboard 318 as a special code. If a valid deactivation signal was received, the system proceeds to state 418. In state 418, the system resets the alarm condition, and advances to state 420, which is an end state.

If a deactivation signal was not received, the system advances to state 408. In state 408, the system activates at least one theft deterrence action. FIG. 4 illustrates three of many possible theft deterrence actions. Note that one or more theft deterrence actions can be taken at the same time. In one possible theft deterrence action, the system proceeds to state 410, wherein the system disables portable computer system 120. In one embodiment, this is accomplished by shutting down electrical power. In another embodiment, this is accomplished by disabling logins. In yet another embodiment, this is accomplished erasing some of the contents of disk 306. The system next proceeds to state 420, which is an end state. In another possible theft deterrence action, the system proceeds to state 412. In state 412, the system generates an audio alarm through audio subsystem 315 and speaker 230. The system next proceeds to state 420, which is an end state.

In yet another possible theft deterrence action, the system proceeds to state 414. In state 414, the system determines its physical location. In one embodiment, the system uses a global positioning system (GPS) receiver 210 to determine its location. The system next proceeds to state 416. In state 416, the system calls a home telephone number through modem 322 and mobile telephone 324. After establishing a telephone call to the home telephone number, the system communicates its position to the home telephone number. The system next proceeds to state 420, which is an end state. In a further embodiment, the theft deterrence mechanism includes a circuit that sends an infrared communication signal to a remote receiver.

Definitions

Alarm condition—a change in state in a computer system made in response to an alarm activation signal. An alarm condition can include, but is not limited to, a change in the state of a variable, or a change in the execution path of a computer program.

Mobile telephone signal—a signal from any type of mobile telephone system. This includes but, is not limited to, a cellular telephone signal and a digital PCS signal.

Pager signal—any electromagnetic signal used to activate a paging device. This includes low-power paging signals of limited range.

Portable computer system—any computer system that can be easily carried by a computer user. This includes, but is not limited to, laptop computers, notebook computers, palmtop computers, personal organizers and personal digital assistants. Portable computer systems typically include a portable source of power, such as a battery.

Storage device—any device that stores data or computer code for a computer system. This includes, but is not limited to, magnetic storage devices, disk drives, semiconductor memory devices, and tape storage devices.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. A method for generating an alarm in a portable computer system, comprising:

detecting at the portable computer system an activation signal for the alarm from a remote transmitter;

setting, in response to the activation signal, an alarm condition at the portable computer system;

determining the location of the portable computing system by detecting a global positioning system (GPS) signal; and activating, in response to the alarm condition, at least one theft deterrence action, the at least one theft deterrence action including transmitting the determined location to a remote receiver.

2. The method of claim 1, including:

detecting at the portable computer system a deactivation signal for the alarm from a remote transmitter; and resetting the alarm condition in response to the deactivation signal at the portable computer system.

3. The method of claim 2, wherein detecting the activation signal and detecting the deactivation signal involve detecting the same signal.

4. The method of claim 1, including resetting the alarm condition if a user of the portable computer system inputs a valid deactivation signal into the portable computer system.

5. The method of claim 1, wherein detecting the activation signal includes detecting a radio frequency signal.

6. The method of claim 1, wherein detecting the activation signal includes detecting an infrared signal.

7. The method of claim 1, wherein detecting the activation signal includes detecting a pager signal.

8. The method of claim 1, wherein detecting the activation signal includes detecting an interruption in a proximity signal, the proximity signal being of limited range and regularly broadcast from the remote transmitter, so that an interruption in the proximity signal indicates that the portable computer system has left the proximity of the remote transmitter.

9. The method of claim 1, wherein activating the at least one theft deterrence action includes generating an audio alarm from the portable computer system.

10. The method of claim 1, wherein activating the at least one theft deterrence action includes sending an infrared communication signal to a remote infrared receiver.

11. The method of claim 1, wherein activating the at least one theft deterrence action includes erasing at least part of the contents of a storage device in the portable computer system.

12. The method of claim 1, wherein activating the at least one theft deterrence action includes disabling power for the portable computer system.

13. The method of claim 1, wherein activating the at least one theft deterrence action includes preventing a login to the portable computer system.

14. A method for generating an alarm in a portable computer system, comprising:

detecting at the portable computer system an activation signal for the alarm from a remote radio frequency transmitter; and setting, in response to the activation signal, an alarm condition at the portable computer system;

determining the location of the portable computing system by detecting a global positioning system (GPS) signal;

activating, in response to the alarm condition, at least one theft deterrence action, the at least one theft deterrence action including transmitting the determined location to a remote receiver;

detecting at the portable computer system a deactivation signal for the theft deterrence action from a remote transmitter; and resetting the alarm condition in response to the deactivation signal at the portable computer system.

15. A method for generating an alarm in a portable computer system, comprising:

detecting at the portable computer system an activation signal for the alarm from a remote transmitter;

setting, in response to the activation signal, an alarm condition at the portable computer system;

determining the location of the portable computing system by detecting a global positioning system (GPS) signal; and activating, in response to the alarm condition, at least one theft deterrence action, wherein activating the at least one theft deterrence action includes sending a mobile telephone signal from the portable computer system to call a telephone number, and transmitting the determined location to a remote receiver.

16. The method of claim 15, wherein sending the mobile telephone signal includes sending the mobile telephone signal through a modem in the portable computer system.

17. The method of claim 15, wherein sending the mobile telephone signal includes sending a signal that can be identified through a caller identification feature in a telephone system.

18. The method of claim 15, wherein sending the mobile telephone signal includes sending a signal that can be identified through a caller identification feature in a telephone system, and including determining a location for the portable computer system through the telephone system.

* * * * *